(12) United States Patent
Mandralis et al.

(10) Patent No.: US 7,685,930 B2
(45) Date of Patent: Mar. 30, 2010

(54) SYSTEM AND METHOD FOR DISPENSING BEVERAGES HAVING DIFFERENT FOAM LEVELS FROM CAPSULES

(76) Inventors: Zenon Ioannis Mandralis, Ch. de la Rochette 10, CH - 1071 Chexbres (GR); Peter Koch, Chemin des Vaux 6, CH - 1350 Orbe (CH); Francisco Campiche, Rue de l'Hôpital 33, CH - 1400 Yverdon-Les-Bains (CH); Jean-Luc Denisart, Ch. du Vigny 2, CH-1096 Cully (CH); Antoine Cahen, Pl. du Nord 2, CH-1005 Lausanne (CH); Alfred Yoakim, Ch. de la Routiaz 2, CH-1806 St-Legier-La Chiesaz (CH)

( * ) Notice: Subject to any disclaimer, the term of this patent is extended or adjusted under 35 U.S.C. 154(b) by 1101 days.

(21) Appl. No.: 10/565,580
(22) PCT Filed: Jun. 21, 2004
(86) PCT No.: PCT/EP2004/006674

§ 371 (c)(1),
(2), (4) Date: Jan. 23, 2006

(87) PCT Pub. No.: WO2005/018395

PCT Pub. Date: Mar. 3, 2005

(65) Prior Publication Data

US 2006/0219098 A1    Oct. 5, 2006

(30) Foreign Application Priority Data

Jul. 23, 2003    (EP) .................................. 03016789

(51) Int. Cl.
*A47J 31/40* (2006.01)
(52) U.S. Cl. ........................................ 99/295; 99/302 R
(58) Field of Classification Search .................. 99/295, 99/323, 302 R; 426/77, 79, 80, 112, 115
See application file for complete search history.

(56) References Cited

U.S. PATENT DOCUMENTS

| | | | | |
|---|---|---|---|---|
| 5,897,899 A | * | 4/1999 | Fond | ........................... 426/112 |
| 5,948,455 A | * | 9/1999 | Schaeffer et al. | ............... 426/77 |
| 7,216,582 B2 | * | 5/2007 | Yoakim et al. | ................. 99/295 |
| 7,412,921 B2 | * | 8/2008 | Hu et al. | ........................ 99/295 |
| 2002/0129712 A1 | | 9/2002 | Westbrook et al. | |

FOREIGN PATENT DOCUMENTS

| | | |
|---|---|---|
| DE | 101 16 239 | 10/2002 |
| EP | 0 512 468 | 11/1992 |
| EP | 1 243 210 | 9/2002 |
| WO | 03/059778 | 7/2003 |

* cited by examiner

*Primary Examiner*—Reginald L Alexander
(74) *Attorney, Agent, or Firm*—K&L Gates LLP

(57) ABSTRACT

A system for selectively delivering different beverages having different foam levels by injection of a fluid under pressure into a capsule that contains a beverage-forming substance. The capsules include a chamber containing the substance and a beverage dispensing structure adapted to retain a certain extraction pressure in the chamber before allowing the beverage to flow out of the capsule. The system is characterized in that first and second capsules are provided for selective use in the system, with the first capsule having a first beverage dispensing structure configured and positioned therein to retain a first extraction pressure in the capsule, prior to the complete delivery of the beverage, and the second capsule having a second beverage dispensing structure configured and positioned therein to retain a second extraction pressure in the capsule, prior to the complete delivery of the beverage. The first extraction pressure is higher than the second extraction pressure so that a greater amount of foam is created upon delivery of the beverage from the first capsule as compared to that created by the second capsule. This allows a user of the system to select a cartridge that produces a beverage with the desired foam content.

2 Claims, 8 Drawing Sheets

SYSTEM AND METHOD FOR DISPENSING BEVERAGES HAVING DIFFERENT FOAM LEVELS FROM CAPSULES

BACKGROUND

The present invention relates to a method for delivering beverages from capsules designed to be extracted under pressure and containing a substance for the preparation of a food product such as a beverage.

Cartridges designed to be extracted under pressure and containing a substance for the preparation of a beverage exists on the market. They provide convenience in operation as well as reproducible extraction conditions, and they ensure freshness of the substance contained therein. This ensures the delivery of beverages of constant quality. European Patent EP 0512468 discloses one such cartridge. That cartridge is intended to be inserted into an extraction system, in which it can be injected with a fluid and opened against a supporting part of the system comprising raised elements under the effect of the pressure of the fluid entering the cartridge. The problem with this cartridge is that the beverage extracted from the cartridge runs over this supporting part and through ducting means, which means that it is difficult due to contamination and taste reasons, to envisage extracting with this system cartridges containing substances other than roasted ground coffee, because of the beverage residue present on the support.

Nestec SA's co-pending International patent application PCT/EP03/00384 filed 16 Jan. 2002 relates to a new type of capsule which does not have this disadvantage, that is to say, the capsule which can contain a wide variety of substances to be extracted as needs be, and which allows preparation and outflow of the beverage without there being a need for the beverage at any time to come into contact with any other parts of the system. The capsule of this co-pending International application is designed to be extracted under pressure, and it comprises a closed chamber containing the substance and means for allowing the capsule to be opened after the beverage is formed, at which time of use the beverage is allowed to flow out of the capsule. Opening of the capsule is achieved by relative engagement of the opening means with a retaining part of the closed chamber and the relative engagement is performed under the effect of a rise in pressure of the fluid in the chamber.

One principle of this invention lies in the fact that each capsule comprises its own opening means activated by the rise of pressure of the fluid introduced into the capsule at the time of its extraction. Another principle of this invention lies in the fact that the capsule has its own outflow passage with its own ducting means making it possible to avoid, or at least the very least considerably reduce, contact with the elements of the system or of the extraction device.

A result of these principles, taken alone or in combination, is that it is possible one after the other, to extract substances of different types or varieties without prejudice to the taste and without the risk of cross-contamination. The capsules can thus contain substances of very diverse nature and/or variety capable of being extracted or dissolved in water. It is thus possible to envisage any substance that is infused and any soluble substance: it must be clearly understood that both for extraction or for infusion or dissolution, the liquid element is hot, cold or warm water. The present invention now recognizes these advantages over the art and has implemented them in a new system and method.

SUMMARY

Accordingly, the present invention relates to a system for selectively delivering different beverages having different foam levels by injection of a fluid under pressure into a capsule that contains a beverage-forming substance. These capsules typically include a chamber containing the substance and a beverage dispensing structure adapted to retain a certain extraction pressure in the chamber before allowing the beverage to flow out of the capsule. The system comprises an extraction device and first and second capsules which are provided for selective use in the extraction device, with the first capsule having a first beverage dispensing structure configured and positioned therein to retain a first extraction pressure in the capsule, prior to the complete delivery of the beverage, and the second capsule having a second beverage dispensing structure configured and positioned therein to retain a second extraction pressure in the capsule, prior to the complete delivery of the beverage. Advantageously, the first extraction pressure is higher than the second extraction pressure so that a greater amount of foam is created upon delivery of the beverage from the first capsule as compared to that created by the second capsule. This allows a user of the system to select a cartridge that produces a beverage with the desired foam content.

Preferably, the first and second capsules each include a substantially identical external configuration and shape, with a lower portion of each capsule configured and positioned to collect the beverage prior to dispensing it. Also, the lower portion of each capsule generally has an opening that forms an outflow passage for dispensing the beverage to the user without contacting or contaminating other portions of the system. In a preferred arrangement, the beverage dispensing structure is provided in the lower portion of the capsules, and the different extraction pressures of the beverage dispensing structures are achieved by different configurations for the beverage dispensing structures. These different configurations of beverage dispensing structures typically include (a) the combination of a membrane and puncturing plate or (b) a filter element of a porous material, used alone or preferably in combination with a supporting plate. A number of preferred embodiments of these different configurations of the beverage dispensing structures are presented herein.

For example, the various advantageous embodiments of the invention include at least one of the following arrangements:

(a) the membrane of the second capsule has a thickness that is different from that of the membrane of the first capsule;

(b) the membrane of the second capsule is made of a material that has a different puncture resistance than the membrane of the first capsule; or (c) the puncturing plate of the first capsule is different from that of the second capsule.

Additionally, one capsule may include a membrane and puncturing plate while the other capsule has a filter element that is optionally supported by a supporting plate.

More preferred configurations of the beverage dispensing structures include at least one of the following features:

(a) the membrane of the second capsule has a thickness that is smaller than that of the membrane of the first capsule, with the first and second membranes being made of a flexible material and being present in a thickness ratio that is between 1.25:1 to 5:1;

(b) the membrane of the second capsule is an aluminium membrane having a thickness of about 5 to 30 microns, and the membrane of the first capsule is an aluminium membrane having a thickness of about 20 to 80 microns;

(c) the puncturing plate of the first capsule has puncturing elements of different sharpness from the puncturing elements of the second capsule; or (e) the puncturing plate of the first capsule has puncturing elements that are present in a different number than the puncturing elements of the second capsule.

For the embodiments where different membranes are used, the puncturing plate of each capsule includes a plurality of puncturing elements. These elements can be the same or different depending upon the desired amount of foam to be produced. For example, the first capsule can include a multitude of protrusions ending by a flattened tip and the second capsule including a multitude of protrusions ending by a sharpened tip, or the first and second capsule each including a multitude of protrusions wherein the second capsule has a greater number of protrusions that the first capsule.

In these embodiments, dispensing of the beverage is achieved after injection of a fluid into the capsule, so that the membrane is perforated by contact with the puncturing plate, or by the fluid injection providing an internal pressure in the cartridge that forces the beverage to pass through the filter element. Due to a rise in pressure in the chamber, either the membrane of each capsule is moved to engage the puncturing plate to pierce the membrane and allow the beverage to be dispensed from the capsule, or the beverage in the chamber is forced to pass through the filter element to be dispensed from the capsule.

The invention is also characterized in that it includes means for providing a fluid to the capsule and a device for holding a selected capsule in an operative position to receive a fluid from the fluid providing means for forming the beverage in the capsule. The capsule holding device preferably has a recess configured in the same size and shape as the external configuration of the capsule, and the fluid providing means preferably includes at least one fluid introduction element for introducing fluid into the capsule when the capsule is positioned in the capsule holder.

The system is operatively associated with a first set of between 2 and 20 first capsules and a second set of between 2 and 20 second capsules. The first set of capsules can be provided in a first package and the second set of capsules is provided in a second package.

Finally, the invention also relates to a method for allowing a user to form a beverage having a desired foam level from a system that forms the beverage by injection of a fluid under pressure into a capsule that contains a beverage-forming substance, with the capsule including a chamber containing the substance and a beverage dispensing structure adapted to retain a certain extraction pressure in the chamber before allowing the beverage to flow out of the capsule. This method is characterized in that first and second capsules are provided for selective use in the system, with the first capsule having a first beverage dispensing structure configured and positioned therein to retain a first extraction pressure in the capsule, prior to delivery of the beverage, and the second capsule having a second beverage dispensing structure configured and positioned therein to retain a second extraction pressure in the capsule, prior to delivery of the beverage, with the first extraction pressure being higher than the second extraction pressure so that a greater amount of foam is created upon delivery of the beverage from the first capsule as compared to that created by the second capsule. Thus, the user can obtain a beverage with the desired foam content by selection of the first or second capsule and introduction of the selected capsule into the system for formation and dispensing of the beverage.

Additional features and advantages are described herein, and will be apparent from, the following Detailed Description and the figures.

BRIEF DESCRIPTION OF THE FIGURES

FIG. 5B being a top perspective view; and FIG. 5C being a side cross-sectional view;

FIG. 8B being a side view and FIG. 8C being a side cross-sectional view.

DETAILED DESCRIPTION

Figure 1A:
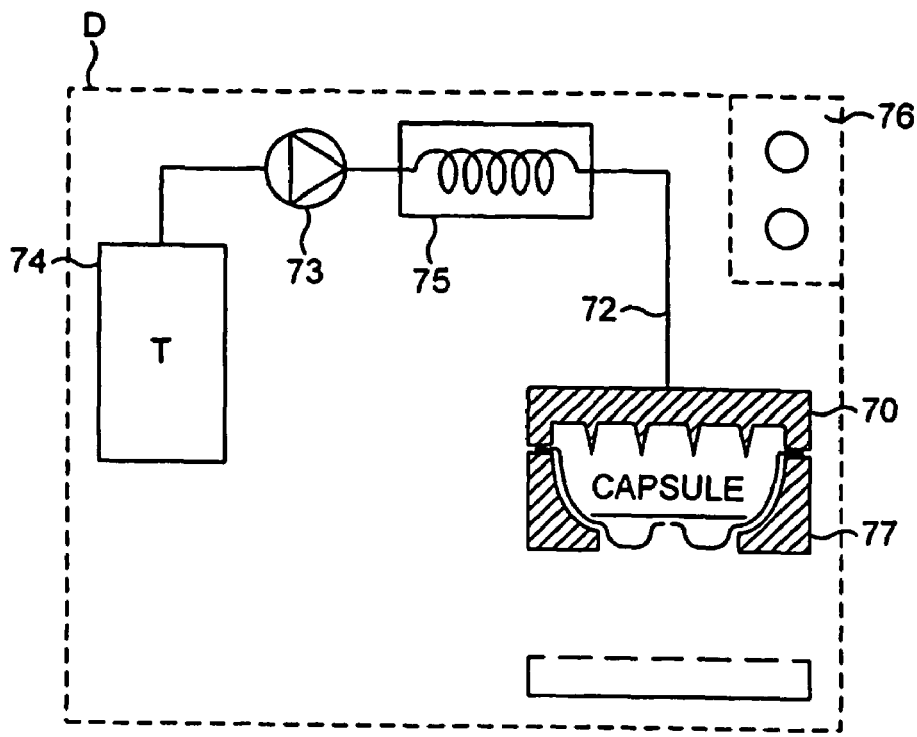
FIG. 1A is a schematic view of the method of the invention which enables to prepare in a convenient way different beverages by using a single device D of extraction of capsules from capsules coming from at least two distinct sets or series $C_1$ and $C_2$, as shown in FIG. 1B

The present invention relates to a system that uses such capsules and their attached benefits, as aforementioned; to further provide beverages with different amounts of foam. Indeed, it is an important benefit to be able to offer, within substantially the same format of capsule, beverages having different foam characteristics. Therefore, beverages of same intrinsic nature but with different amounts of foam can be delivered such as coffees with crema or non-foamed coffees, foamed teas or non-foamed teas, while using a single machine and advantageously capsules of the same or substantially the same format; i.e., the same size and external design.

Therefore, it is made possible to deliver beverages of very different foam characteristics depending upon the pressure controlled inside the capsules. In the first set of capsules, one may deliver, for instance, short espresso coffee with crema, whereas in the second set of capsules, one may deliver espresso coffee or soluble coffee but with little or no significant head of foam to fit the expectations of different types of consumers.

As a whole, the capsules of each set may be marketed in such a way to be easily distinguishable by the consumer using different identification external codes such as by different colours, names, design, packaging or other sorts of codes. Preferably, the first set of capsules and the second set of capsules are packaged in separate packages before being marketed such as in distinct cardboard sleeves or in thin plastic bags or any other suitable and convenient packages that are generally known in the art.

In the context of the invention, a set of capsules means a series of at least one capsule, preferably 2 or more capsules. While there is no theoretical maximum limit for the capsules, the upper limit will generally be at least 10 to 20 to 25 or more. Large cartons with 100 to 200 capsules or more are easily achievable when desired. The first and second set of capsules are generally packaged separately, but they could be packaged together provided that the user can distinguish between the different capsules due to colour, marking or other identifying indicia.

The extraction pressure is defined as the maximal amount of pressure during extraction of the substance by the fluid entering the capsule and exiting from the other side through the substance.

As a preference, the beverage dispensing structure of the capsules are formed by the combination of an opening means and a retaining wall in a manner that the opening of the retaining wall is achieved by relative engagement of opening means with the retaining wall of the chamber and is performed under the effect of the rise in pressure of the fluid in the chamber. The expression "relative engagement" is to be understood as meaning: either the opening means or the membrane or retaining wall of the chamber, or alternatively both can be moved one with respect to the other to effect opening.

Therefore, in a first principle the beverage dispensing structure of both the first and second sets of capsules comprises a non-permeable retaining wall and an opening means and wherein the opening is achieved by relative engagement of the opening means with the retaining wall of the closed chamber and is performed under the effect of the rise in pressure of the fluid in the chamber. The retaining wall of the first set of capsules opens by engagement with the opening means at a higher extraction pressure than the opening means of the second set of capsules.

The opening means may be housed inside the chamber and thus be moved by thrust under the effect of the rise in pressure of the fluid in the chamber against the retaining part of the chamber. As an alternative, the opening means may be housed outside the chamber and the retaining wall is then moved under the effect of the rise in pressure against the opening means. In this case, the opening means may be housed in the capsule but outside the chamber containing the substance.

The chamber, of course, has to be understood as sufficiently closed by the retaining wall to retain the extraction pressure. The capsule does not necessarily need to be entirely impermeable but, on the contrary, may be permeable at its entry to the injection fluid, for instance. The chamber should be impervious to oxygen in the case it contains substances which are sensitive to oxygen.

More preferably, the opening means comprises at least one puncturing plate and the retaining wall comprises a flexible membrane to be punctured by the at least one puncturing plate.

Therefore, the capsules of the second set are preferably designed with a membrane that is more easily puncturable than the membrane of the capsules of the first set. As the membrane of the second set of capsules can be more easily punctured, a relatively lower extraction pressure is created inside the capsule thus finally generating a lesser height of foam in the cup.

More preferably, the membrane of the second set of capsules can be made thinner than the membrane of the first set of capsules. The thickness of the membranes is dependent on various factors such as the material, the amount of foam desired, the nature of the substance, the dosing, etc. However, the membrane of the second set of capsules is preferentially, at least 1.5 times thinner, more preferably about 2 times thinner, than the membrane of the first set of capsules.

Particularly good results have been obtained with the membrane of the second set of capsules being an aluminium membrane of about 5 to 30 microns, whereas the membrane of the first set of capsules is an aluminium membrane of about 20 to 80 microns.

Typically, the first set of capsules may contain between 4 to 10 grams of ground coffee with an aluminium membrane of about 30 microns to provide an espresso type of coffee with a good crema at the top, whereas the second set of capsules may contains the same or a different ground coffee, dosed between 4 to 10 grams, but with an aluminium membrane of about 15 microns to provide a cup of coffee with no or little foam created.

As an alternative or in combination with the different thicknesses, the membrane of the second set of capsules may also be made of a different material that has a lower puncture resistance than the material of the first set of capsules. For instance, the membranes can be made of polymers of different grades that offer different puncturing characteristics for a same thickness.

As a preference, the at least one puncturing plate of the second set of capsules has a sharper profile than the puncturing plate of the first set of capsules. The sharper the puncturing plate, the lower the extraction pressure can be maintained in the chamber before opening occurs by the relative engagement of the membrane and the puncturing plate.

The puncturing plate may form a surface comprising a multitude of puncturing protrusions. The number of protrusions may be comprised between 1 to 100, preferably 10 to 50.

Therefore, in one embodiment, the number of puncturing protrusions of the plate of the first set of capsules is greater than the number of protrusions of the plate of the second set of capsules. Such a configuration is preferred because such a higher number of protrusions forms an overall larger surface of contact with the retaining wall which acts as a pressure-spreading means and has the effect of allowing the pressure of the fluid to rise sufficiently higher inside the capsule before puncturing occurs. Inversely, the lower number of protrusions creates much more localized pressures on the membrane which so more easily breaks or is cut whereby a lower extraction pressure is retained in the chamber.

As a preference, the protrusions of the puncturing plate of capsules of the second set can also be made sharper and/or thinner at the tip than the protrusions of the puncturing plate of capsules of the first set.

For instance, in a preferred embodiment, the first set of capsules comprises a multitude of tapered protrusions ending by a flattened tip. Such configuration enables to maintain extraction pressure relatively high, e.g., in the order of 4 to 8 bars. In the second set of capsules, the protrusions preferably end by sharpened tips. Such configuration enables to maintain lower extraction pressure in the order of 1.2 to 4 bars.

In another embodiment, the retaining means of the first set of capsules comprises a non-permeable retaining wall and an opening means and wherein the opening is achieved by relative engagement of the opening means with the non-permeable retaining wall of the chamber and is performed under the effect of the rise in pressure of the fluid in the chamber and, the retaining means of the second set of capsules comprises a permeable retaining wall allowing the beverage to flow out and retaining a lower extraction pressure than the retaining means of the first set of capsules.

The skilled artisan now will recognize that the extent of the foam to be provided in a particular beverage can be achieved by the judicious selection of membrane and puncturing elements. For the greatest amount of foam, a relatively thick membrane of puncture resistant material is used in combination with a relatively large number of flat or non-sharp puncturing elements as this allows the greatest pressures to be achieved in the capsule along with the greatest number of tortuous paths for the liquid to follow before it can exit the capsule. Of course, the membrane and puncturing elements are designed to rupture before the walls of the capsule or that of the heat sealed lid thereon. When low or no foam is desired, a relatively thin membrane of easily puncturable material is used in combination with a smaller number of very sharp puncturing elements. This keeps the internal pressure of the capsule sufficient low to avoid foam formation.

Another way to achieve low or no foam beverages is to utilize a filter element rather than a membrane and puncturing elements. In particular, the permeable retaining wall of the capsules of the second set, can include a filter and, optionally, a support plate is placed underneath the filter to prevent it from breaking or tearing. The filter can be made of a suitable paper, fibres, or other suitable porous material. The filter may be provided in the form of a sheet or mat. The thickness and materials of the mat can vary as desired by the capsule designer. When a thinner filter is desired, the support plate also holds the filter in the proper position in the capsule. The support plate should be porous or at least have sufficient holes or apertures such that the beverage that passes through the filter can pass through the support and out of the capsule. Alternatively, the filter can be of a size such that it fills the base of the capsule and thus would need no support other than that provided by the wall of the lower portion of the capsule. The filter can be selected to provide a desired quality or clarity of the final product, and little or no foam.

Generally, beverages that possess a low level of foam, if any, are provided by the second set of capsules. Based on the selection of the puncturing means and membrane, however, the first set of capsules can serve to provide beverages with a much higher foam level. For example, the first set of capsules can serve to prepare espresso type of coffee whereas the capsules of the second set can serve to prepare coffee with no froth or foam at all.

The capsules of the invention advantageously also have means for the collection and outflow of the beverage. Such means has the purpose of directing the stream or streams of beverage leaving the capsule towards the container, such as a mug, and of thus avoiding any contact with part of the system. The collection and outflow means preferably comprises a part of widened cross section covering the retaining part of the chamber followed by a part of narrowed cross section that concentrates the beverage into one or several favoured directions. The parts of widened and narrowed cross sections may form one and the same continuous portion that flares from the retaining part towards one or more outlets of the capsules. Such a portion may, for example, be a cup portion of concave internal shape directed downwards, which end in at least one outlet hole.

The beverage is urged to flow out of the outlet hole due to the pressure of the liquid that is introduced into the capsule. When a membrane and puncturing elements are used, the beverage passes out of the device after the membrane is punctured. When a filter is used, the pressure of the liquid in the capsule causes the beverage to pass through the filter and then out of the capsule through the outlet hole.

The closed chamber of the capsules comprises either half-shells or a cup and a membrane, or a cup and a disc. As the case may be, the material of the closed chamber is preferably chosen from the group consisting of aluminium, an aluminium/plastic composite, an aluminium/plastic paper composite, single layer or multi-layer plastic. The plastic used is a plastic compatible in the sphere of foods and chosen from the group consisting of EVOH, PVDC, PP, PE, PA, PVC and PET and combinations thereof.

The substance for the preparation of the beverage is chosen from the group consisting of roasted ground coffee, tea, instant coffee, a mixture of roasted ground coffee and instant coffee, a liquid concentrate, a fruit extract, a chocolate product, a milk-based product or any other dehydrated or concentrate edible substance, such as dehydrated stock. It is possible according to the invention to prepare with equal ease a cold, hot or warm beverage.

The method of the invention allows multicomponent beverages to be extracted from equipment having a single or multiple capsule holders in a straightforward way. The capsule holder will typically comprise a lower capsule support element and an upper injection element. The holder allows the extraction fluid, typically water, to arrive on the top of the capsule via a duct and injection points that perforate the top of the capsule. The support element holds the capsule in place and at the time of its opening beverage runs directly through the outlet into the cup placed beneath without contacting the support element. The capsule holder is usually moveable from an open position to receive the capsule to a closed position in which the capsule is entrapped between the elements.

The terms "puncture" and "puncturing" relate to one or more means whose function is to make an opening against a solid, flexible or otherwise, weakened or partially open portion, not only by puncturing in the strict sense of the term but also by any equivalent means such as cutting, tearing or breaking.

Figure 1B:
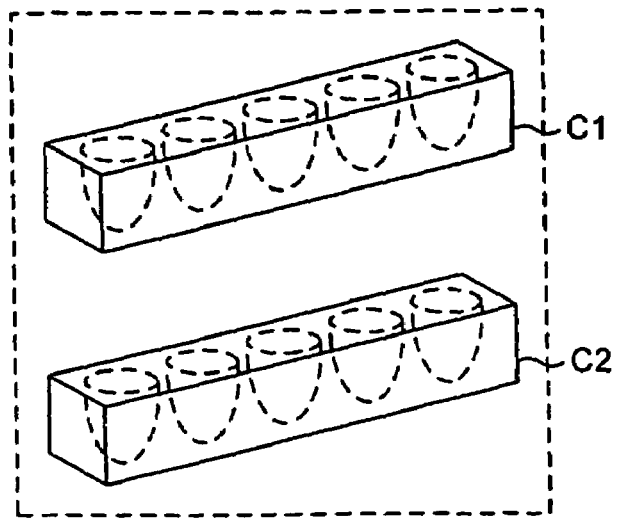

Referring now to the drawings, as illustrated in FIGS. 1A and 1B, the method of the invention is a method for preparing beverages of different kinds, in particular, by using an extraction device D from capsules containing the substance to be extracted; the capsules belonging to different sets or series of capsules $C_1, C_2, \ldots Cn$, which offer different foam characteristics as resulting from their extraction through the extraction device wherein the foam characteristics will depend upon which set the capsules come from.

In a general manner, the extraction device is designed to provide an individual serving portion of a freshly extracted beverage from an individual capsule. Extracted beverages include beverages such as coffee, tea, cocoa, and the like, including mixture thereof. The device is particularly useful in the private home environment, although their use is not limited to that environment. Accordingly, the device will also be useful, for example, in institutions, offices and restaurants where a variety of beverages may be required at about the same time. The device comprises essential components to deliver a fluid, typically water, under pressure in the capsule.

FIGS. 1A and 1B schematically illustrates the overall system of the invention. A device provided with at least one fluid line 72 to which the fluid can be supplied to the capsule via an injector 70. A capsule holder 77 is provided to support the capsule and to maintain it properly and tightly in contact with the injector. The fluid pressure is supplied in the line by means of a pump 73. A reservoir of fluid 74 can be installed upstream the pump to enable to supply fluid in sufficient amount for delivering fluid to extract more than one capsule. A heating system can be installed along the line between the reservoir and the extraction head 70, 74 to heat the fluid at a required temperature. The reservoir could also be as such a boiler that can keep the fluid warm or hot. A control board 76 with switches is also usually helpful to automatically start the extraction cycle. Different controls can be added such temperature sensors, timers, flow meters, pressure sensors, vanes, probes and so on for controlling and monitoring the extraction operations.

FIGS. 2, 3, 4A and 4B illustrate a first set of capsules to implement the method of the invention in order to prepare beverages with a relatively high amount of foam. The structure of the capsules in general will be described hereafter in relation to these figures. It will be explained whose are the possible changes to be considered to the capsules of a first set, for instance of set $C_1$ of FIG. 1, to provide capsules for a second set, for instance of set $C_2$ of FIG. 1, which would deliver a lesser amount of foam as resulting from the extraction process with a fluid under pressure.

The capsules of the invention generally comprise a cup 2 and a puncturable lid 3 such as a membrane that is welded along the peripheral welding edge 31 to the periphery of the cup. The cup comprises an internal shoulder 21 that defines the limits of an upper compartment 22 and a lower compartment 23. At the shoulder is welded a membrane 4 that forms the retaining means of the capsule for the food substance 5 to be extracted which is contained in the upper compartment 22. The combination of the lid 3, upper compartment 22 and membrane 4 form together the closed chamber of the capsule that is pressurized upon injection of a fluid under pressure.

The means allowing opening is arranged in the lower compartment 23 of the cup. This means consists of a puncturing element 8 in the shape of a plate seating in the lower compartment 23 and which co-acts in relative engagement with the membrane 4 of the cup when a fluid is injected under pressure in the upper compartment.

The puncturing element or plate 8 may preferably comprise a multitude of protrusions 81 distributed over the surface of the element and directed toward the membrane 4.

Figure 6:
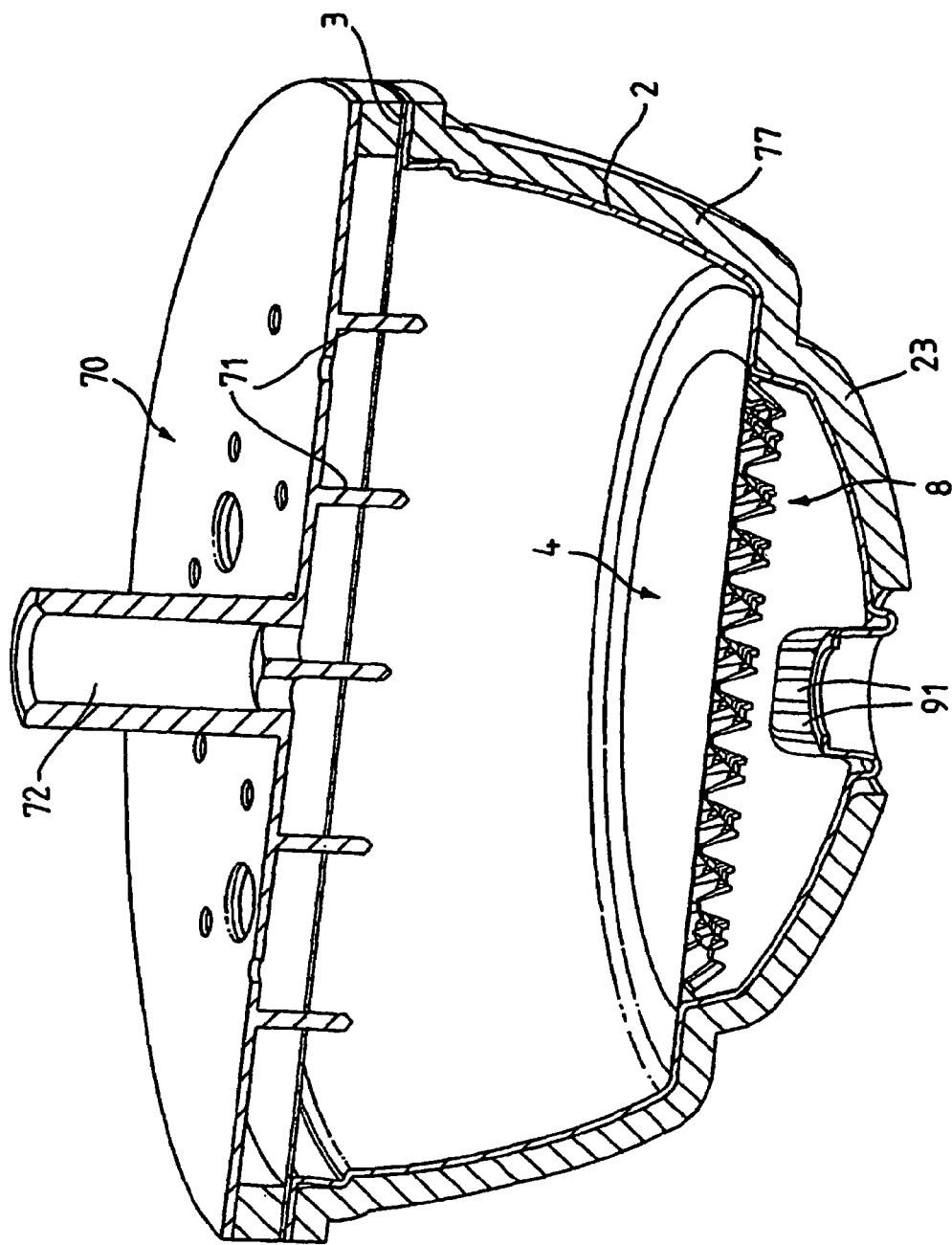
FIG. 6 shows the capsule of FIG. 2 in engagement in a capsule holding recess in an extraction device.

At the time of extraction, the capsule is introduced into the extraction device and water is introduced through the lid 3 by means of the injector 70 comprising needles 71, as shown in FIG. 6. Water is injected under pressure by means of a pump of the device (not shown). As water enters the closed chamber, a rise of pressure is created which presses the membrane 4 of the beverage retaining means against the puncturing element 8 so as to tear the membrane and the beverage can thus flow out into a cup or mug arranged beneath.

Figure 4A:
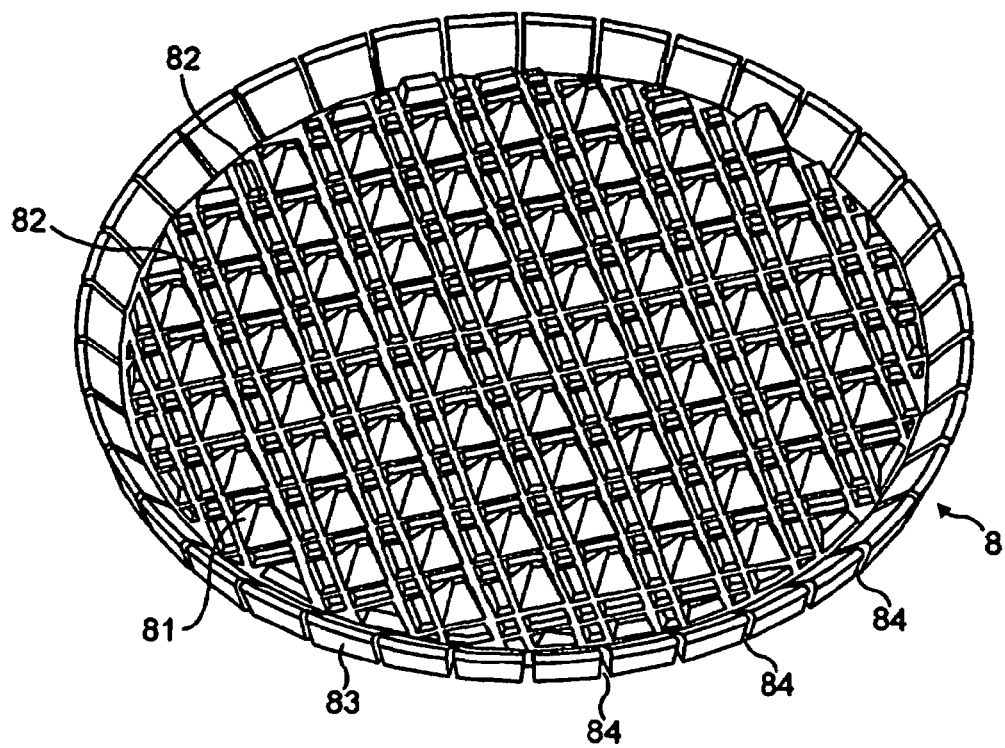
FIGS. 4A and 4B are views of the beverage dispensing structure of FIGS. 2 and 3 to illustrate the puncturing elements and base used in the first set of capsules, with FIG. 4A being a perspective view and FIG. 4B being a bottom view.

As shown in FIG. 4A, between protrusions are created channels or recesses 82 enabling the liquid extract to flow. The element 8 thus has a filter function for the passage of the beverage. The channels 82 are present at the surface of the element forming a crossed pattern and thus separate at least partially the protrusions 81. The beverage flows along the channels and ends up at the periphery 83 of the element 8 where it flows to the inside of the lower compartment 23 of the cup (shown in FIG. 2). The element can have a number of thin channels such as slits 84 arranged at the periphery of the element 8 which serve as a foam conditioner by collapsing the larger bubbles and letting only the smaller bubbles pass therethrough, as shown in FIGS. 4A and 4B.

Figure 4B:
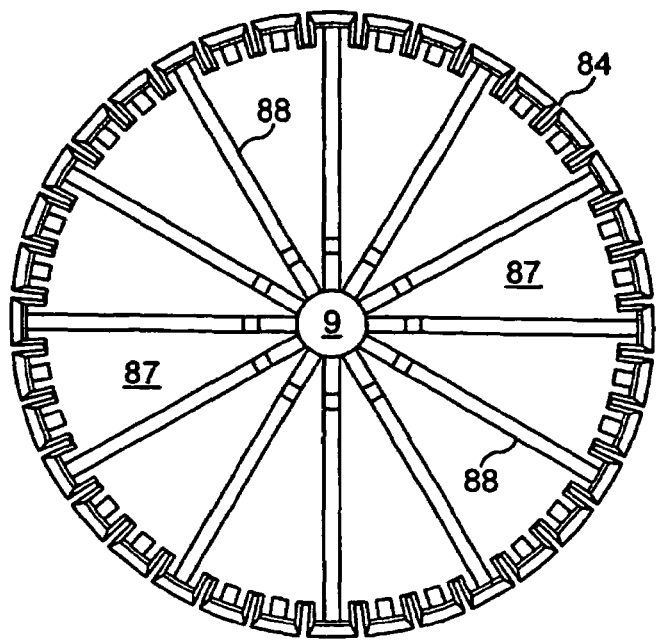

As shown in FIG. 4B, these bubbles are collected in converging passages 87 which are separated by radially arranged ribs 88 on the underside of the plate 8 in the lower compartment 23 of the capsule. This structure forms means for the collection and outflow of the beverage and directs the stream or streams of beverage leaving the capsule toward the outlet 9 and then into a cup. The single outlet 9 concentrates the flow in a favoured direction.

Figure 2:
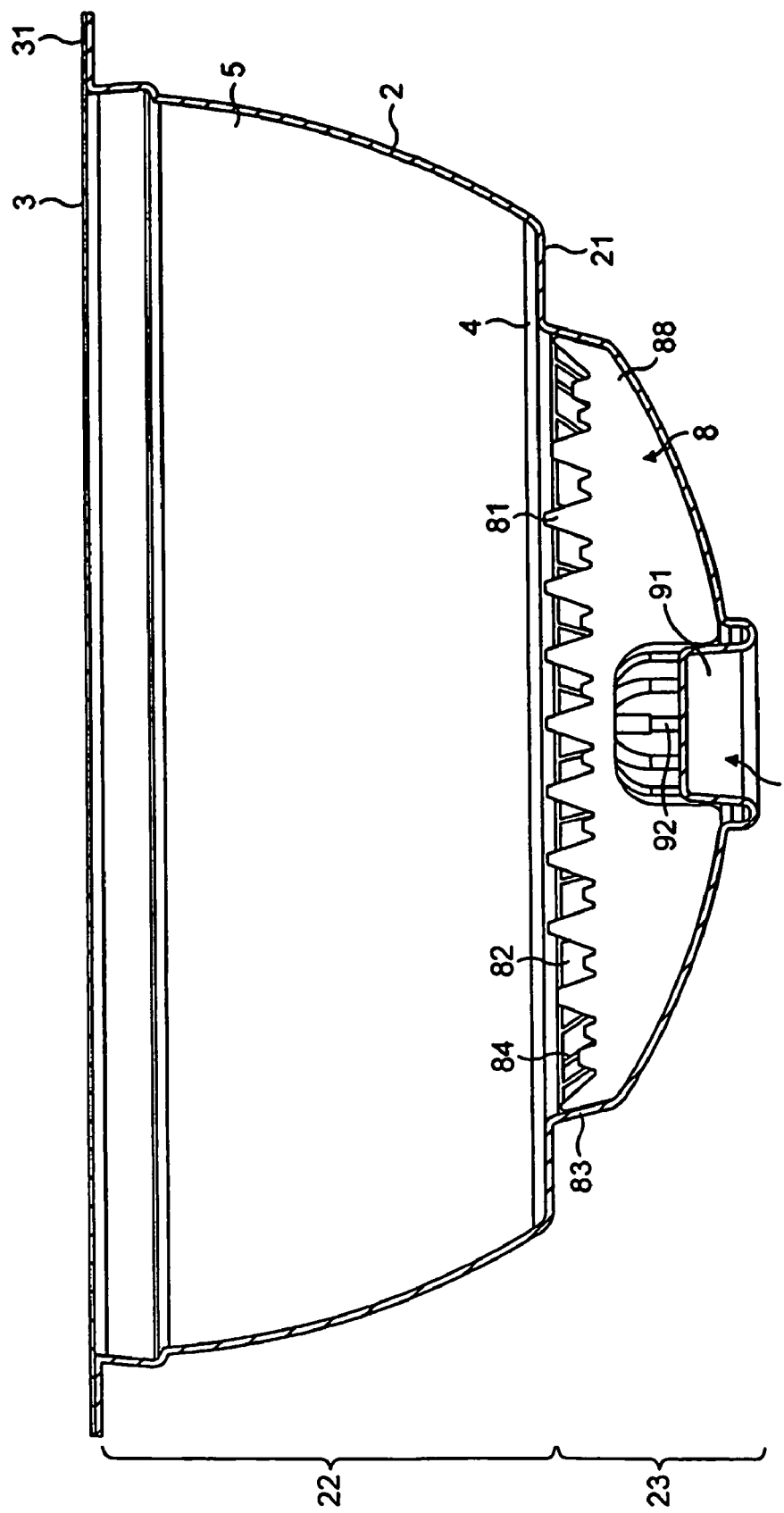
FIG. 2 is a cross-sectional view of a capsule of the first set according to the present invention.

As shown in FIGS. 2 and 4B, the ribs 88 terminate at the outlet 9 at a baffle 91. The baffle breaks the speed and velocity of the flow of beverage, and assists in the collection of the beverage before it is dispensed. Openings 92 are provided in the ribs by cutting back part of the end of the ribs above the baffle to provide for fluid distribution in the lower portion of the capsule prior to dispensing of the beverage. This provides a controlled flow of beverage out of the capsule and prevents spurts or other splashing of beverage during dispensing from the capsule.

According to one aspect of the invention, the method contemplates the extraction of a first set of capsules, packaged for instance, as a boxed five capsule set $C_1$, shown in FIG. 1B, which have a retaining means which are arranged in such a manner that a higher extraction pressure is retained during the extraction process as compared to capsules of a second set, packaged for instance, as a boxed set, $C_2$, also of five capsules as shown in FIG. 1B.

One preferred way of achieving the method is to make the membrane 4 more easily puncturable for the second set of capsules $C_2$ than for the first set of capsules $C_1$. In one possibility, the membrane 4 is made thinner for the second set of capsules. In another possibility, the membrane 4 is made of a material which has a lower puncture resistance.

Figure 8A:
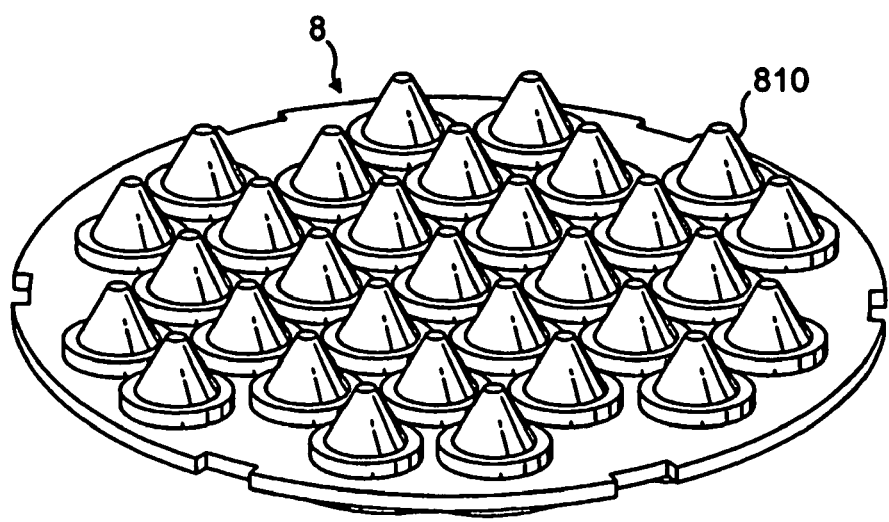
FIGS. 8A, 8B and 8C are views of an alternative beverage dispensing structure to illustrate further puncturing elements and base used in the first set of capsules shown in FIGS. 2 and 3, with FIG. 8A being a top perspective view.

In another arrangement, the puncturing element 8 for the first set of capsules has less sharp puncturing elements 810, as shown in FIG. 8A and/or a greater number of protrusions. The puncturing elements 811 of the second set of capsules may have a sharper profile, as shown in FIG. 5B, and/or a lesser number of protrusions in order to engage the membrane along a smaller overall puncturing surface. The puncturing elements 810 of FIG. 8A comprises a multitude of tapered protrusions; each ending by a flattened tip, while the puncturing element 811 of FIG. 5B comprises a multitude of tapered protrusions; each ending by a sharpened tip.

The specific shape of the puncturing elements is not critical and can be varied as desired to assist in greater or lesser puncturing of the membrane. For example, truncated pyramids (i.e., pyramids with four sides and flat tops) are illustrated in FIGS. 4A and 4B, while cones are illustrated in FIG. 5B and truncated cones in FIG. 8A. The number of sides of the puncturing elements is not critical but 1 (for a cone) 3, 4 or 6 are preferred. The height of the elements or the amount of flat surface at the tops of such elements is also not critical provided that the elements do provide a puncturing function.

Figure 5A:
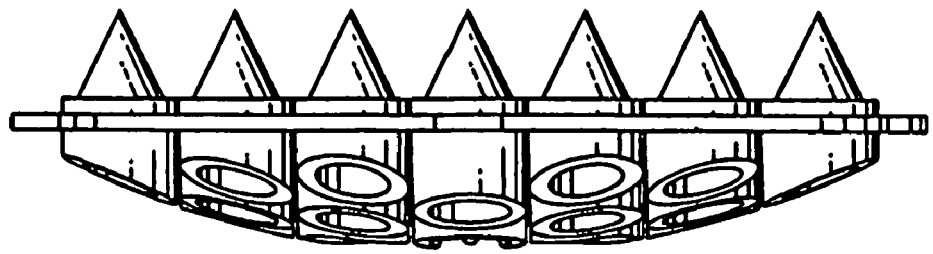
FIGS. 5A, 5B and 5C are views of a beverage dispensing structure to illustrate the puncturing elements and base used in the second set of capsules, with FIG. 5A being a side view.
Figure 5B:
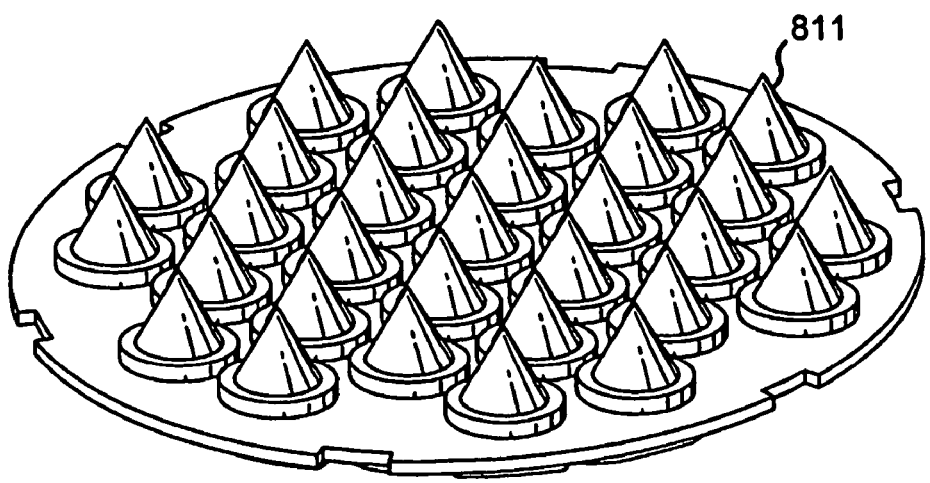
Figure 5C:
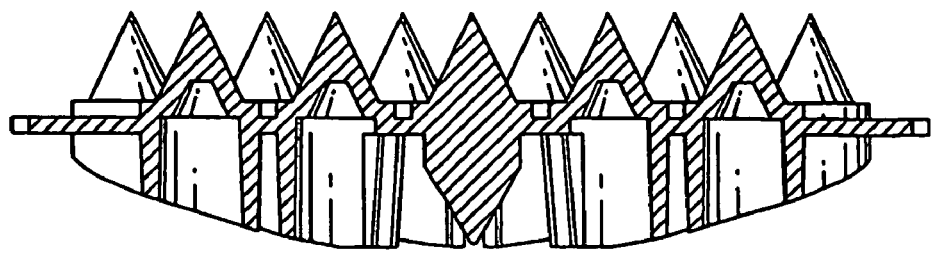
Figure 8B:
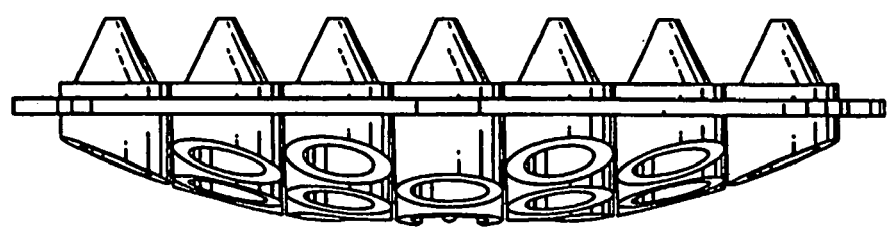
Figure 8C:
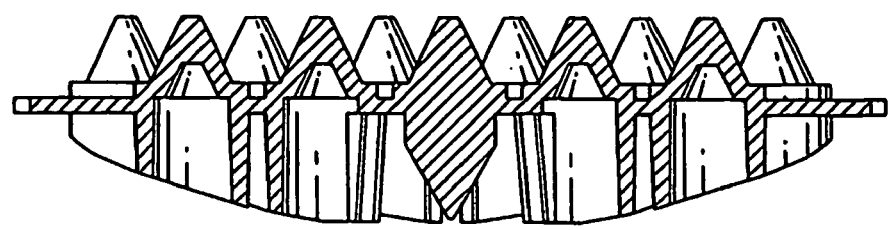

FIGS. 8B and 8C illustrate the base of the puncturing plate of FIG. 8A, while FIGS. 5A and 5C illustrate the base of the puncturing plate illustrated in FIG. 5B. These bases are configured and dimensioned to conform to and be supported by the lower portion of the capsule. The puncturing elements are mounted on a plate that includes cut-out portions or openings about their peripheries. After the membrane is punctured by the puncturing elements, the formed beverage passes along the plate and around the puncturing elements and then to and through the openings into the lower portion of the capsule. The collected beverage in the lower portion of the capsule can be dispensed though an outlet hole directly into a container or cup for consumption by the user. As noted above, the formed beverage does not contact any other parts or portions of the extraction device so that different beverages can be prepared without concern of the mixing of residues from one beverage with that of a subsequent beverage to affect its organoleptic properties.

Figure 3:
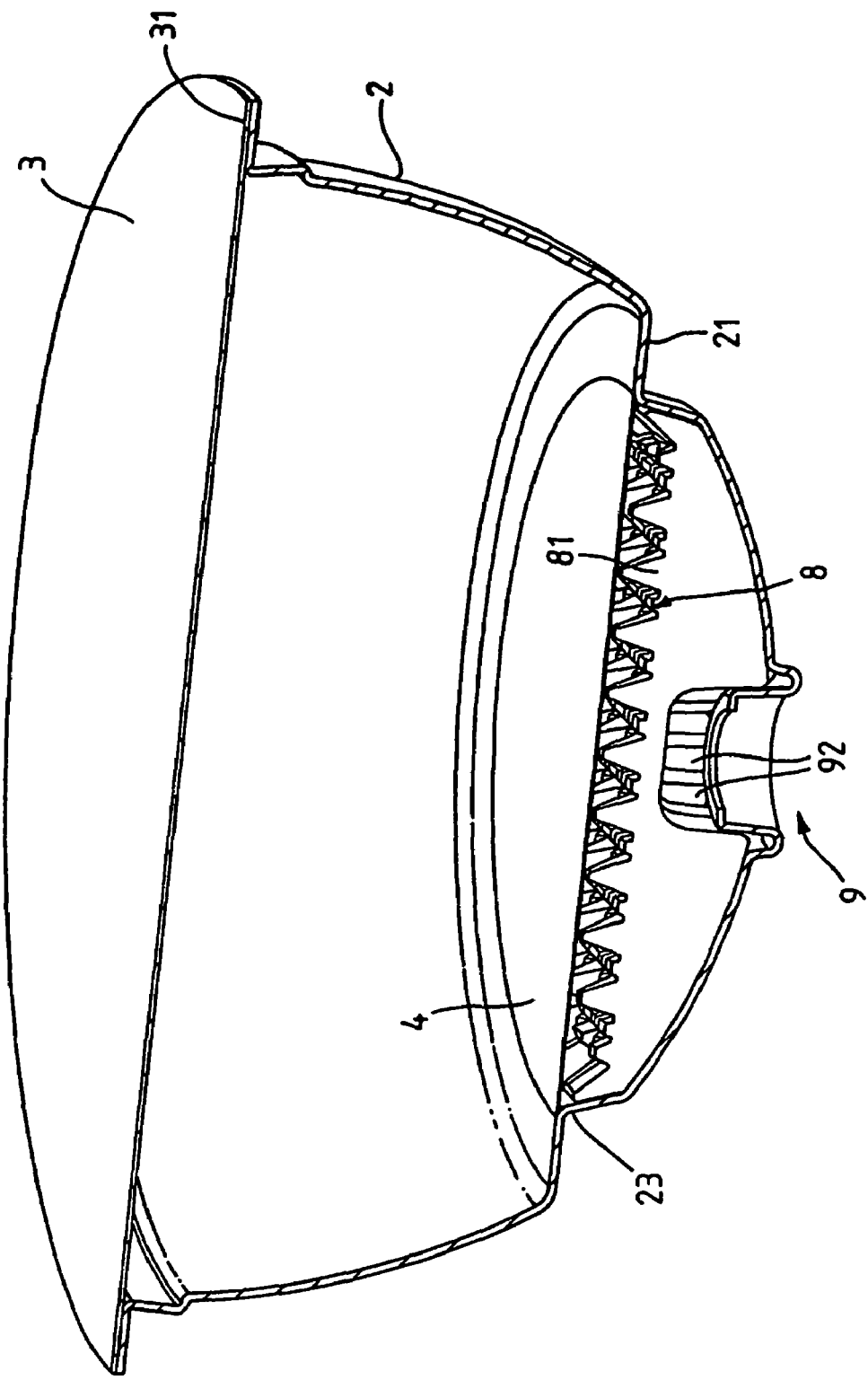
FIG. 3 is a perspective view of the capsule of FIG. 2.
Figure 7:
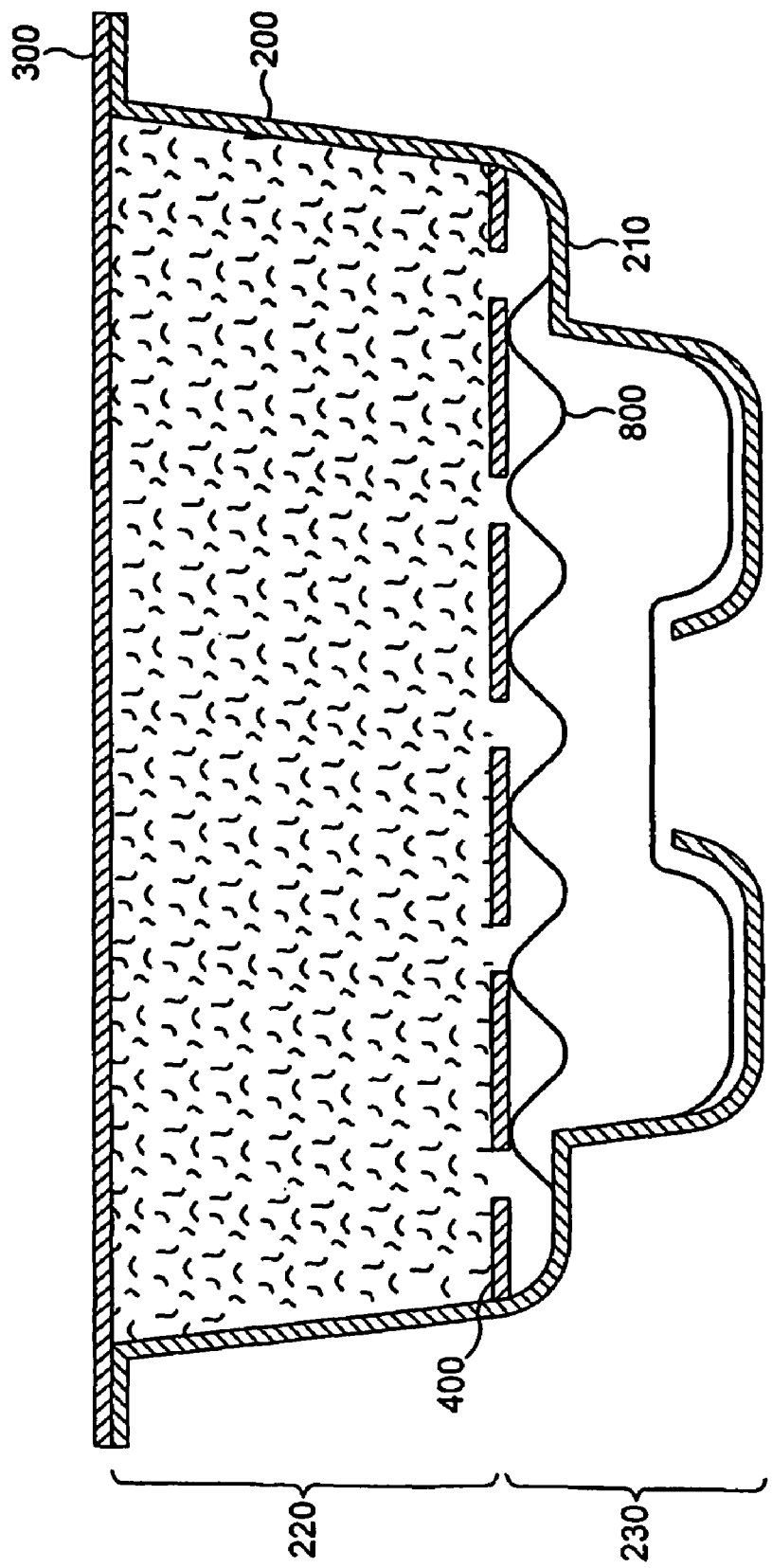
FIG. 7 shows a capsule that has a beverage dispensing structure in the form of a filter element.

FIG. 7 shows yet another capsule which provides less foam as the capsules with the retaining means of FIGS. 2 and 3. In FIG. 7, the capsule comprises a cup 200 and a puncturable lid 300 sealed along the peripheral edge of the cup. The cup comprises an internal shoulder portion 210 which defines limits for an upper compartment 220 and a lower compartment 230. At the shoulder portion 210 is welded a filter in the form of a permeable retaining wall 400 supported by a supporting plate 800 which acts to prevent the retaining wall 400 from breaking. The retaining wall 400 may preferably be a thin wall with a plurality of small apertures or pores enabling the flow of beverage therethrough. As noted above, it instead can be made of paper or fibres. The supporting plate can be used to support these materials, and both allow the beverage to pass therethrough at relatively low pressures so that the production of foam is minimized or prevented. The supporting plate 800 could be a grid or an apertured rigid corrugated plate, for instance.

EXAMPLES

For all examples below the same extraction machine has been used with no modification in regards to the pump, heater, water injection or any other element of the machine.

Example 1

Coffee with Foam 7 gr of ground coffee (blend of ⅓ each Colombia, Costa Rica and Ethiopia beans roasted at 105 CTn a measured by Neuhaus Colour test II) are placed in a plastic capsule which at its bottom has an Aluminium foil of 30 microns thick. The coffee is ground to approximately 400 microns average particle size. When hot water is delivered by the machine to the capsule, the pressure rises until the Aluminium foil is perforated against the bottom opening means, which comprises a plastic plate having several spikes pointing against the Aluminium foil. This plate is shown in FIG. 4A. Because of the geometry of the spikes (flat top) and the large number of them, as well as due to the thickness of the Aluminium foil, the extraction pressure rises to an average of 6.4 bar before the foil is pierced.

Approximately 110 g of water are allowed to pass through the coffee in the capsule. This results in a coffee cup with a rich foam layer on top. This foam layer is about 0.5 to 0.8 cm deep depending on the surface area of the cup. Another characteristic of the consistency and persistence of this foam layer is that if sugar crystals are gently deposited on the top the need several seconds to sink through the foam layer (approximately 5-10 s). The overall character of the cup obtained by this example is reminiscent of "espresso" coffee both due to its rich flavour and mainly due to the rich foam layer on top of the cup.

Alternatively, if only approximately 40 g of water are allowed to pass through the coffee in the capsule, an "espresso" cup is produced also characterised by rich, persistent foam. Both large and small coffee cups produced by this example are highly desirable for their taste as well as their visual aspect especially by those used to the Italian "espresso" style coffee products. To further increase the "espresso" character and enhance the foam of such beverages, it is possible and even desirable to reduce the coffee particle size for example to 250 microns.

Example 2

Tea with Foam 3 g of tea (Assam fannings) are placed in a capsule identical to that of Example 1 (with Aluminium foil of 30 micron and the puncturing plate shown in FIG. 4A). When 110 g of hot water are delivered by the extraction machine, the extraction pressure rises to 5.2 bar. The tea beverage thus produced is also exhibiting foam on the surface of the cup. The foam is less than in the case of coffee I the example before (typically 0.2-0.5 cm) but nevertheless is persistent so that it remains on the surface of the beverage even as the beverage is being consumed. Although this might be desirable for certain consumers, foam is generally not accepted as a sign of high quality tea.

Example 3

Coffee with Less Foam

Using the same coffee (type, mass, granulometry) and the same extraction system as in Example 1, the Aluminium foil thickness was reduced to 15 microns. The plastic plate used as the opening means remained the same (as shown in FIG. 4A). Due to the tendency of the thinner Aluminium foil to open against the opening means at lower pressure, the extraction pressure was reduced to 2.9 bar. This results in a coffee beverage (110 g cup) with a thin layer of foam on the top (0.1-0.2 cm). This layer, contrary to that of Example 1 cannot retain for any time any sugar crystals deposited on it.

Example 4

Tea with Less Foam

Tea (same type and amount as in Example 2) was used in a capsule prepared just as described in Example 3 (15 micron Aluminium foil and opening means as shown in FIG. 4A). The resulting extraction pressure was 1.9 bar and much less foam was produced when compared to the foam produced by Example 2.

Example 5

Tea with Less Foam

Same tea as in example 4 was used in a capsule that is characterised by 30 micron Aluminium foil as well as a sharper opening means (as shown in FIG. 5B). The effect of the sharper opening means is that the extraction pressure drops at 1.5 bar and the tea beverage produced this way has slightly less foam than that of Example 4. Further on, a thinner Aluminium membrane (15 micron) was used together with the sharp opening means (as shown in FIG. 5B). This resulted in 1.4 bar extraction pressure and very little foam on the surface of the cup. Generally, tea beverages with very little or no foam are considered more acceptable by the consumers.

Example 6

Coffee/Tea with No Foam

The aluminium foil used by Examples 1-5 was replaced by a paper filter which was held in the capsule by being heat sealed at the periphery of the capsule bottom and was also supported by a porous plastic plate, which for convenience was the puncturing plate shown in FIG. 4A. 7 g of coffee (same as in Example 1) or 3 g of tea (as in Example 2) where placed in the capsule. During extraction with 110 g of hot water as delivered by the machine, there was very little pressure rise (mainly due to the flow of water through the product mass). In the case of coffee the extraction pressure reached 1 bar and in the case of tea the extraction pressure reached 0.5 bar. Due to this low pressure, there was absolutely no foam on the surface of either beverage. In certain cultures (e.g., in the U.S.A. or U.K.) consumers are more used to coffee that has no foam (as when produced by the standard brewing machines equipped with paper filter). It is therefore desirable to be able to offer this kind of beverage by substantially keeping the same capsule format. Tea with no foam is generally preferred as well.

In the case of using paper filter or other permeable material at the bottom of the capsule, it is advisable that each capsule or a number of them are placed inside a pouch which protects the product content against oxygen or humidity damage. Alternatively, the outlet 9 can be covered with a seal of an adhesive plastic film.

Abbreviations

PET=polyester
PP=polypropylene
EVOH=a copolymer of ethylene and vinyl alcohol
PVDC=polyvinylidene chloride
PE=polyethylene
PA=polyamide
PVC=polyvinyl chloride It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system for selectively delivering different beverages having different foam levels by injection of a fluid under pressure into a capsule that contains a beverage-forming substance, the capsule including a chamber containing the substance and a beverage dispensing structure adapted to retain an extraction pressure in the chamber before allowing the beverage to flow out of the capsule the system comprising:

an extraction device and first and second capsules, wherein the first and second capsules each include a substantially identical external configuration and shape, with a lower portion of each capsule configured and positioned to collect the beverage prior to dispensing it, and wherein the lower portion of each capsule has an opening that forms an outflow passage for dispensing the beverage to the user without contacting or contaminating other portions of the system;

the capsules being provided for selective use in the extraction device, with the first capsule having a first beverage dispensing structure so constructed and arranged to retain a first extraction pressure in the capsule, prior to the complete delivery of the beverage, and the second capsule having a second beverage dispensing structure so constructed and arranged to retain a second extraction pressure in the capsule, prior to the complete delivery of the beverage, with the first extraction pressure being greater than the second extraction pressure so that a greater amount of foam is produced upon delivery of the beverage from the first capsule as compared to that produced by the second capsule, so that a user of the system can select a cartridge that produces a beverage with the desired foam content.

2. A system for selectively delivering different beverages having different foam levels by injection of a fluid under pressure into a capsule that contains a beverage-forming substance, the capsule including a chamber containing the substance and a beverage dispensing structure adapted to retain an extraction pressure in the chamber before allowing the beverage to flow out of the capsule the system comprising:

an extraction device and first and second capsules, wherein the first and second capsules each include a substantially identical external configuration and shape, with a lower portion of each capsule configured and positioned to collect the beverage prior to dispensing it;

the capsules being provided for selective use in the extraction device, with the first capsule having a first beverage dispensing structure so constructed and arranged to retain a first extraction pressure in the capsule, prior to the complete delivery of the beverage, and the second capsule having a second beverage dispensing structure so constructed and arranged to retain a second extraction pressure in the capsule, prior to the complete delivery of the beverage, with the first extraction pressure being greater than the second extraction pressure so that a greater amount of foam is produced upon delivery of the beverage from the first capsule as compared to that produced by the second capsule, so that a user of the system can select a cartridge that produces a beverage with the desired foam content, wherein the beverage dispensing structure is provided in the lower portion of the capsules, and the different extraction pressures of the beverage dispensing structures are achieved by different configurations for the beverage dispensing structures, the different configurations being selected from the group consisting of a membrane, a puncturing plate and combinations thereof, the puncturing plate having a plurality of puncturing elements, with the first capsule including a multitude of protrusions ending by a flattened tip and the second capsule including a multitude of protrusions ending by a sharpened tip.

* * * * *